United States Patent
Terasaka et al.

(10) Patent No.: US 8,684,850 B2
(45) Date of Patent: Apr. 1, 2014

(54) CONSTANT VELOCITY UNIVERSAL JOINT

(75) Inventors: Yoshinori Terasaka, Iwata (JP);
Tomoshige Kobayashi, Iwata (JP);
Kisao Yamazaki, Iwata (JP); Minoru Ishijima, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/637,093

(22) PCT Filed: Mar. 23, 2011

(86) PCT No.: PCT/JP2011/056889
§ 371 (c)(1),
(2), (4) Date: Sep. 25, 2012

(87) PCT Pub. No.: WO2011/125491
PCT Pub. Date: Oct. 13, 2011

(65) Prior Publication Data
US 2013/0012326 A1    Jan. 10, 2013

(30) Foreign Application Priority Data

Apr. 2, 2010 (JP) .................................. 2010-086323
May 13, 2010 (JP) ................................ 2010-111251

(51) Int. Cl.
*F16D 3/24* (2006.01)
(52) U.S. Cl.
USPC ......................................... 464/145; 464/906
(58) Field of Classification Search
USPC .......... 464/15, 145, 906; 29/898.066; 384/516
See application file for complete search history.

(56) References Cited

U.S. PATENT DOCUMENTS

| | | | |
|---|---|---|---|
| 7,094,155 B2 * | 8/2006 | Hosoya et al. | ................. 464/145 |
| 2007/0202958 A1 | 8/2007 | Ichikawa | |

FOREIGN PATENT DOCUMENTS

| JP | 55-126124 A | * 9/1980 | .................. 464/145 |
|---|---|---|---|
| JP | 2007-139094 | 6/2007 | |
| JP | 2007-255707 | 10/2007 | |
| JP | 2007-260698 | 10/2007 | |
| JP | 2008-002624 | 1/2008 | |
| JP | 2009-079684 | 4/2009 | |
| JP | 2009-185933 | 8/2009 | |

OTHER PUBLICATIONS

International Preliminary Report on Patentability and Written Opinion of the International Searching Authority issued Nov. 22, 2012 in International (PCT) Application No. PCT/JP2011/056889.
International Search Report issued May 31, 2011 in International (PCT) Application No. PCT/JP2011/056889.

* cited by examiner

*Primary Examiner* — Gregory Binda
(74) *Attorney, Agent, or Firm* — Wenderoth, Lind & Ponack, L.L.P.

(57) ABSTRACT

A constant velocity universal joint has track shapes which facilitate quality control on a forging die set, securing higher durability through securement of a stable contact state of forging-molded tracks and finishing-processed tracks with respect to balls. At least one of each of track grooves of an outer joint member and each of track grooves of an inner joint member is formed by cold-forging finishing. A track groove bottom side of the at least one of each of the track grooves is formed into a Gothic arch shape in horizontal cross-section, and a track groove opening side of the at least one of each of the track grooves is are each formed into an elliptical shape in horizontal cross-section.

35 Claims, 11 Drawing Sheets

Fig. 7A  Fig. 7B  Fig. 7C
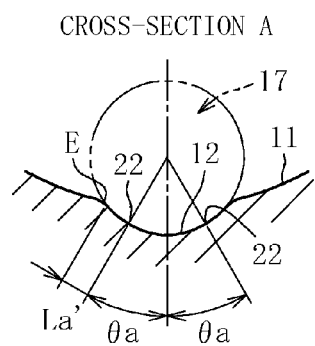
CROSS-SECTION A
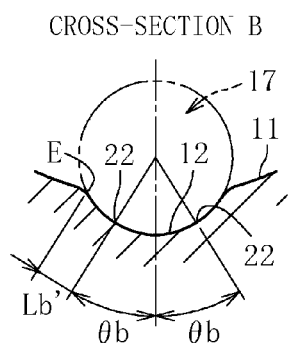
CROSS-SECTION B
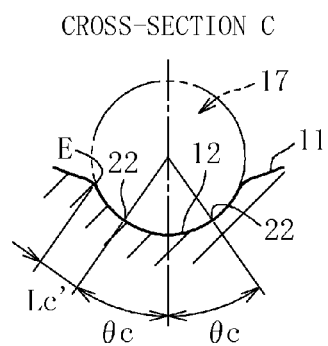
CROSS-SECTION C
Fig. 8A  Fig. 8B  Fig. 8C
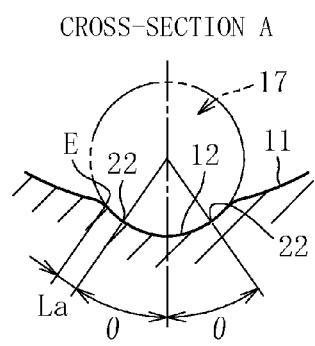
CROSS-SECTION A
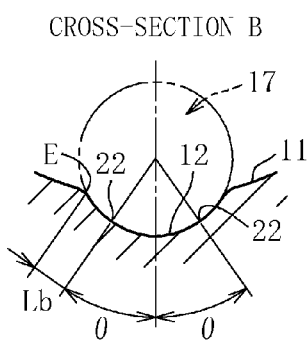
CROSS-SECTION B
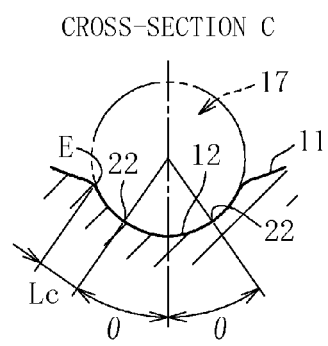
CROSS-SECTION C

CONSTANT VELOCITY UNIVERSAL JOINT

TECHNICAL FIELD

The present invention relates to a constant velocity universal joint, and more particularly, to a constant velocity universal joint that can be used for half shafts, a propeller shaft, and the like of an automobile.

BACKGROUND ART

Examples of the constant velocity universal joints include a fixed type constant velocity universal joint, such as a Rzeppa type constant velocity universal joint (BJ) and an undercut free type constant velocity universal joint (UJ), and a plunging type constant velocity universal joint, such as a double offset type constant velocity universal joint (DOJ) and a cross groove type constant velocity universal joint (LJ).

The fixed type constant velocity universal joint of the Rzeppa type includes an outer joint member having an inner spherical surface equiangularly provided with a plurality of track grooves formed along an axial direction, an inner joint member having an outer spherical surface equiangularly provided with a plurality of track grooves formed along the axial direction in pairs with the track grooves of the outer joint member, a plurality of balls interposed between the track grooves of the outer joint member and the track grooves of the inner joint member so as to transmit torque, and a cage interposed between the inner spherical surface of the outer joint member and the outer spherical surface of the inner joint member so as to hold the balls.

The outer joint member and the inner joint member of such a constant velocity universal joint are manufactured by the method as follows. First, a columnar billet is formed by hot forging, warm forging, or cold forging into a schematic shape of the outer joint member or the inner joint member, and then subjected to a turning process into an arbitrary shape. After that, the columnar billet is subjected to heat treatment, and the outer spherical surface, the inner spherical surface, and the track grooves are subjected to a finishing process such as grinding and quenched-steel cutting.

The finishing process performed on the track grooves after forging, turning, and heat treatment as described above involves inconveniences such as increase in cost of equipment and tools required for the finishing process on the track grooves, time periods required for the finishing process, and a low material yield. As a countermeasure, there has been disclosed a method in which at least one of or both the track grooves of the outer joint member and the track grooves of the inner joint member are formed by cold-forging finishing (Patent Literature 1). When the track grooves are formed by cold-forging finishing as disclosed therein, the track grooves are formed only by cold-forging finishing. Thus, various machining processes such as a cutting process, a grinding process, and the like that have been conventionally performed after cold forging can be omitted. As a result, yields can be increased, and cost of the constant velocity universal joint can be reduced.

CITATION LIST

Patent Literature 1: JP 2008-2624 A

SUMMARY OF INVENTION

Technical Problem

By the way, it is desired that a horizontal sectional shape of the track grooves of such a constant velocity universal joint be formed to hold the track grooves and the balls in angular contact with each other so that a contact state of the balls with respect to the track grooves is stabilized. In a method of performing the finishing process such as grinding and quenched-steel cutting, the track grooves have been formed into an elliptical shape in horizontal cross-section in view of types of the tool and the processing method. Meanwhile, in a method of performing cold-forging finishing, the track grooves have normally been formed into a Gothic arch shape in horizontal cross-section in view of ease in forging molding and quality control.

In an inside of the constant velocity universal joint bearing a torque load, a load is transmitted in the following order: the inner joint member (outer joint member); the balls; and the outer joint member (inner joint member). Contact points between the balls and the tracks shift to the spherical surface portion side (balls climb the track slopes) depending on a size of a PCD gap between the inner joint member and the outer joint member, a magnitude of the torque, and the like. As a result, a contact angle varies.

Comparison of the track grooves (Gothic arch shape) formed by cold-forging finishing according to the above-mentioned conventional art and the processed track grooves (elliptical shape) proves that a difference in shape therebetween leads to a difference in shift distance of the contact points (displacement amount of a contact angle). Thus, for example, when the tracks of the outer joint member and the tracks of the inner joint member are processed by different methods, the contact angle of each of the balls and corresponding one of the tracks of the outer joint member and corresponding one of the tracks of the inner joint member cannot be formed within a range of target values. As a result, there arises a risk that variation in durability occurs.

FIG. 15 illustrates a horizontal sectional shape of a conventional forging-molded track, and FIG. 16 illustrates a horizontal sectional shape of a finishing-processed track. The horizontal sectional shape of a normal forging-molded track groove is obtained by projection of a simple round shape with respect to a vertical axis. Thus, a vertical clearance (VC) (dimension between a groove bottom 2 of a track groove 1 and a groove bottom corresponding portion 3a of a ball 3) to be formed on the track groove bottom 2 side can be increased. Therefore, shape management can be easily performed through VC measurement. However, the horizontal sectional shape of the finishing-processed track groove 1 is an elliptical shape, and hence the VC decreases on the track groove bottom 2 side. In other words, when a VC amount of the forging-molded track is represented by VC1 and a VC amount of the finishing-processed track is represented by VC2, a relationship VC1>VC2 is established. Thus, when the shape of the finishing-processed track is applied to the forging-molded track which is not subjected to the finishing process, it is more difficult to manage shapes of dies and forged products in comparison with those in a case of the simple round shape.

It is therefore an object of the present invention to propose a constant velocity universal joint having track shapes which facilitate quality control on a forging die set and products as in a conventional case while securing higher durability through securement of a stable contact state of the forging-molded tracks and the finishing-processed tracks with respect to the balls.

Solution to Problem

According to the present invention, there is provided a first constant velocity universal joint, comprising: an outer joint member having an inner surface provided with track grooves;

an inner joint member having an outer surface provided with track grooves; torque transmitting balls arranged in torque transmitting ball tracks formed in cooperation between the track grooves of the outer joint member and the track grooves of the inner joint member, the track grooves of the inner joint member corresponding to the track grooves of the outer joint member; and a cage for holding the torque transmitting balls, wherein at least one of each of the track grooves of the outer joint member and each of the track grooves of the inner joint member is formed by cold-forging finishing, wherein a track groove bottom side of the at least one of the each of the track grooves of the outer joint member and the each of the track grooves of the inner joint member is formed into a Gothic arch shape in horizontal cross-section, and wherein track groove opening sides of the at least one of the each of the track grooves of the outer joint member and the each of the track grooves of the inner joint member are each formed into an elliptical shape in horizontal cross-section.

According to the present invention, there is provided a second constant velocity universal joint which is a fixed type constant velocity universal joint, comprising: an outer joint member having an inner surface provided with track grooves; an inner joint member having an outer surface provided with track grooves; torque transmitting balls arranged in torque transmitting ball tracks formed in cooperation between the track grooves of the outer joint member and the track grooves of the inner joint member, the track grooves of the inner joint member corresponding to the track grooves of the outer joint member; and a cage for holding the torque transmitting balls, wherein at least one of each of the track grooves of the outer joint member and each of the track grooves of the inner joint member is formed by cold-forging finishing, wherein a track groove bottom side of the at least one of the each of the track grooves of the outer joint member and the each of the track grooves of the inner joint member is formed into a Gothic arch shape in horizontal cross-section, wherein track groove opening sides of the at least one of the each of the track grooves of the outer joint member and the each of the track grooves of the inner joint member are each formed into an elliptical shape in horizontal cross-section, and wherein a continuous angle between the Gothic arch shape and the elliptical shape is gradually reduced from a track-groove open angle side toward a joint deep side.

In each of the constant velocity universal joints of the present invention, a side near the spherical surface (track groove opening sides) can be formed into an elliptical shape similar to that of finishing-processed track grooves. In other words, a functionally required track range is formed into an elliptical shape, and a track range required for management is formed into a Gothic arch shape.

In particular, in the above-mentioned second constant velocity universal joint, the continuous angle (continuous position) between the Gothic arch shape and the elliptical shape is gradually reduced from the track-groove open angle side (joint opening side) toward the joint deep side. Thus, a contact ellipse is less liable to protrude even on the joint deep side. In this case, a contact angle may be set to gradually decrease from the track-groove open angle side as the joint opening side toward the joint deep side.

The continuous position of the Gothic arch shape and the elliptical shape may be located on a groove opening side within a range of from 30 degrees to 45 degrees with respect to a straight line connecting a ball center and a track groove bottom center, or may be located on the groove opening side within a range of from 20 degrees to 35 degrees with respect to the straight line connecting the ball center and the track groove bottom center. In a range less than 20 degrees, the VC amounts required for shape management are insufficient, and meanwhile, in a range exceeding 45 degrees, a track surface (range) in the range exceeding 45 degrees is small, and hence an influence derived from employment of the elliptical shape is limited (advantage cannot be exerted).

Track chamfers may be formed respectively along a boundary portion between the inner surface and the each of the track grooves of the outer joint member and a boundary portion between the outer surface and the each of the track grooves of the inner joint member, and a round portion coupled to corresponding one of the track grooves of the outer joint member and a round portion coupled to corresponding one of the track grooves of the inner joint member may be respectively formed on the track groove side of the track chamfer of the outer joint member and the track groove side of the track chamfer of the inner joint member. Further, the track chamfer formed along the boundary portion between the inner surface and the each of the track grooves of the outer joint member and the track chamfer formed along the boundary portion between the outer surface and the each of the track grooves of the inner joint member may be each formed into a round shape.

Further, an inlet chamfer formed along an entire circumference of an opening rim of the outer joint member, the track chamfer formed along the boundary portion between the inner surface and the each of the track grooves of the outer joint member, and a track-inlet chamfer formed along a boundary portion between the inlet chamfer and the each of the track grooves of the outer joint member can be formed by cold-forging finishing.

The inlet chamfer formed along an opening end surface of the outer joint member or the entire circumference of the opening rim of the outer joint member may be formed by cold-forging finishing. Further, the track grooves of the outer joint member and the track-inlet chamfer of the outer joint member may be formed by simultaneous cold-forging finishing, or the track grooves of the outer joint member, the track chamfer of the outer joint member, the track grooves of the inner joint member, and the track chamfer of the inner joint member may be formed by simultaneous cold-forging finishing.

The constant velocity universal joints of the present invention may comprise a fixed type constant velocity universal joints of a Rzeppa type in which the track groove bottom is formed only of a circular-arc portion, and a fixed type constant velocity universal joint of an undercut free type in which the track groove bottom is formed of a circular-arc portion and a linear portion.

Further, the constant velocity universal joints of the present invention may comprise a plunging type constant velocity universal joint of a double offset type in which the inner surface of the outer joint member has a cylindrical shape, in which the track grooves of the outer joint member extend in an axial direction, in which the outer surface of the inner joint member has a spherical shape, in which the track grooves of the inner joint member extend in the axial direction, and in which a curvature center of a spherical outer peripheral surface of the cage and a curvature center of a spherical inner peripheral surface of the cage are axially offset to each other in opposite directions with respect to a joint center by equal distances.

Further, the constant velocity universal joints of the present invention may comprise a plunging type constant velocity universal joint of a cross grove type in which the outer joint member has an inner peripheral surface in which track grooves formed obliquely crosswise in directions opposite to each other with respect to an axial line are alternately arranged in a circumferential direction, in which the inner joint member has an outer peripheral surface in which track grooves formed obliquely crosswise in the directions opposite to each other with respect to the axial line are alternately arranged in the circumferential direction, and in which the torque transmitting balls are incorporated in intersecting portions between the track grooves of the inner joint member, which are formed obliquely crosswise in the directions opposite to each other with respect to the axial line, and the track grooves of the outer joint member, which are formed obliquely crosswise in the directions opposite to each other with respect to the axial line.

The constant velocity universal joints of the present invention can be used as a fixed type constant velocity universal joint for a drive shaft of an automobile, a plunging type constant velocity universal joint for a drive shaft of an automobile, and the like. Alternatively, the constants velocity universal joints of the present invention can be used as a fixed type constant velocity universal joint for a propeller shaft of an automobile, a plunging type constant velocity universal joint for a propeller shaft of an automobile, and the like.

It is preferred that a number of the torque transmitting balls be ten or less.

Advantageous Effects of Invention

In each of the constant velocity universal joints of the present invention, the functionally required track range is formed into an elliptical shape, and the track range required for management is formed into a Gothic arch shape. With this, quality control on a forging die set and products can be facilitated, and at the same time, the contact state of the balls and the track grooves can be stabilized.

In particular, in the second constant velocity universal joint, a contact ellipse is less liable to protrude even at shallow parts on a joint deep side of track grooves, and hence higher durability can be secured.

The continuous position of the Gothic arch shape and the elliptical shape is located on the groove opening side within the range of from 20 degrees to 45 degrees with respect to the straight line connecting the ball center and the track groove bottom center. With this, the VC amounts for shape management can be sufficiently secured. In this way, the functionally required track surfaces can be sufficiently secured.

The inlet chamfer of the outer joint member, the track chamfers of the outer joint member, the track chamfers of the inner joint member, the track-inlet chamfer between the inlet chamfer and each of the track grooves of the outer joint member, and the like are finished by cold forging. Thus, a cutting process, a grinding process, and the like, which have been conventionally performed after cold forging, can be omitted. With this, yields can be increased, and manufacturing cost of the constant velocity universal joints can be reduced.

In particular, the track grooves and the track-inlet chamfers of the outer joint member are formed by simultaneous cold-forging finishing, or the track grooves and the track chamfers of the outer joint member and the track grooves and the track chamfers of the inner joint member are formed by simultaneous cold-forging finishing. With this, productivity can be enhanced.

The sufficient number of torque transmitting balls is ten or less, and hence a degree of freedom in design becomes higher. As a result, excellent designability can be achieved. Further, the present invention is applicable to constant velocity universal joints of various types.

BRIEF DESCRIPTION OF DRAWINGS

[FIG. 7A] A view of the track groove of the outer joint member in a cross-section A of FIG. 6.

[FIG. 7B] A view of the track groove of the outer joint member in a cross-section B of FIG. 6.

[FIG. 7C] A view of the track groove of the outer joint member in a cross-section C of FIG. 6.

[FIG. 8A] A view of the track groove of the outer joint member in a case where continuous angles are not changed in the cross-section A of FIG. 6.

[FIG. 8B] Another view of the track groove of the outer joint member in the case where the continuous angles are not changed in the cross-section B of FIG. 6.

[FIG. 8C] Still another view of the track groove of the outer joint member in the case where the continuous angles are not changed in the cross-section C of FIG. 6.

DETAILED DESCRIPTION OF THE INVENTION

In the following, description is made of embodiments of the present invention with reference to the drawings.

Figure 4:
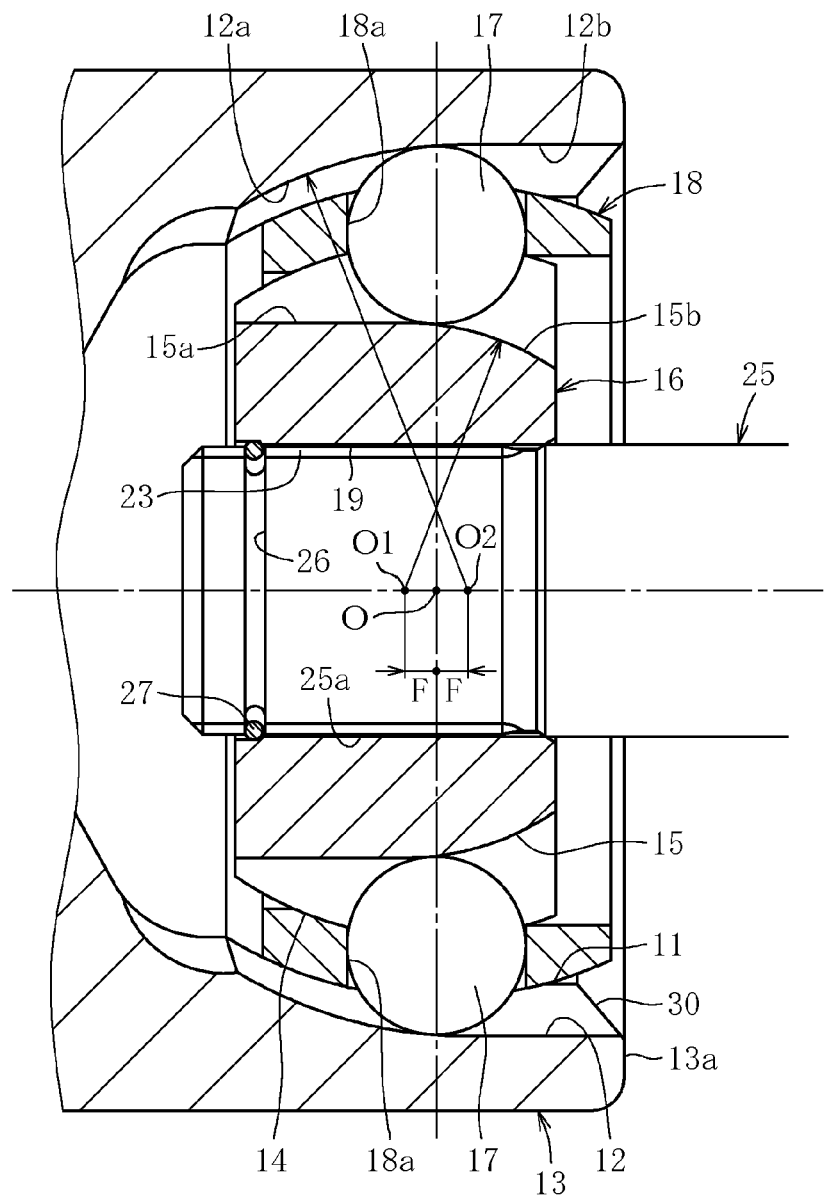
[FIG. 4] A sectional view of the constant velocity universal joint.

FIG. 4 illustrates a fixed type constant velocity universal joint of an undercut free type, which is a fixed type constant velocity universal joint of the present invention. The fixed type constant velocity universal joint comprises an outer joint member 13 having an inner spherical surface (inner surface) 11 equiangularly provided with a plurality of track grooves 12 formed along an axial direction, an inner joint member 16 having an outer spherical surface (outer surface) 14 equiangularly provided with a plurality of track grooves 15 formed along the axial direction in pairs with the track grooves 12 of the outer joint member 13, a plurality of balls 17 interposed between the track grooves 12 of the outer joint member 13 and the track grooves 15 of the inner joint member 16 so as to transmit torque, and a cage 18 interposed between the inner spherical surface 11 of the outer joint member 13 and the outer spherical surface 14 of the inner joint member 16 so as to hold the balls 17. A plurality of pockets 18a for housing the balls 17 are arranged along a circumferential direction of the cage 18.

A deep side and an opening side of each of the track grooves 12 of the outer joint member 13 are respectively formed as a circular-arc portion 12a and a linear portion 12b. A deep side and an opening side of each of the track grooves 15 of the inner joint member 16 are respectively formed as a linear portion 15a and a circular-arc portion 15b. A curvature center O1 of the track grooves 15 of the inner joint member 16 and a curvature center O2 of the track grooves 12 of the outer joint member 13 are axially offset to each other in opposite directions with respect to a joint center O by equal distances F and F.

The inner joint member 16 is provided with a shaft fit-in hole portion 19, and a female spline 23 is formed on an inner surface of the shaft fit-in hole portion 19. An end-portion male spline 25a of a shaft 25 is fitted in the shaft fit-in hole portion 19 of the inner joint member 16 so that the end-portion male spline 25a is fitted to the female spline 23 of the inner joint member 16. Note that, a circumferential groove 26 is provided at an end portion of the end-portion male spline 25a, and a stopper ring 27 is mounted to the circumferential groove 26.

Figure 5:
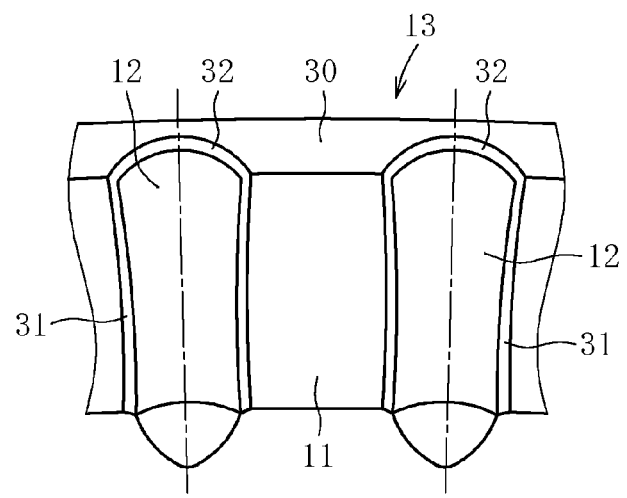
[FIG. 5] A simplified developed view of the track grooves of the outer joint member of the constant velocity universal joint.

As illustrated in FIG. 5, an inlet chamfer (cup-inlet chamfer) 30 is formed along the entire circumference of an opening rim of the outer joint member 13. Track chamfers 31 are formed along boundary portions between the inner surface 11 and the track grooves 12. Track-inlet chamfers 32 are formed along boundary portions between the track grooves 12 and the cup-inlet chamfer 30.

Further, track chamfers 33 (refer to FIG. 2) are formed along boundary portions between the outer surface 14 and the track grooves 15 of the inner joint member 16.

Figure 1:
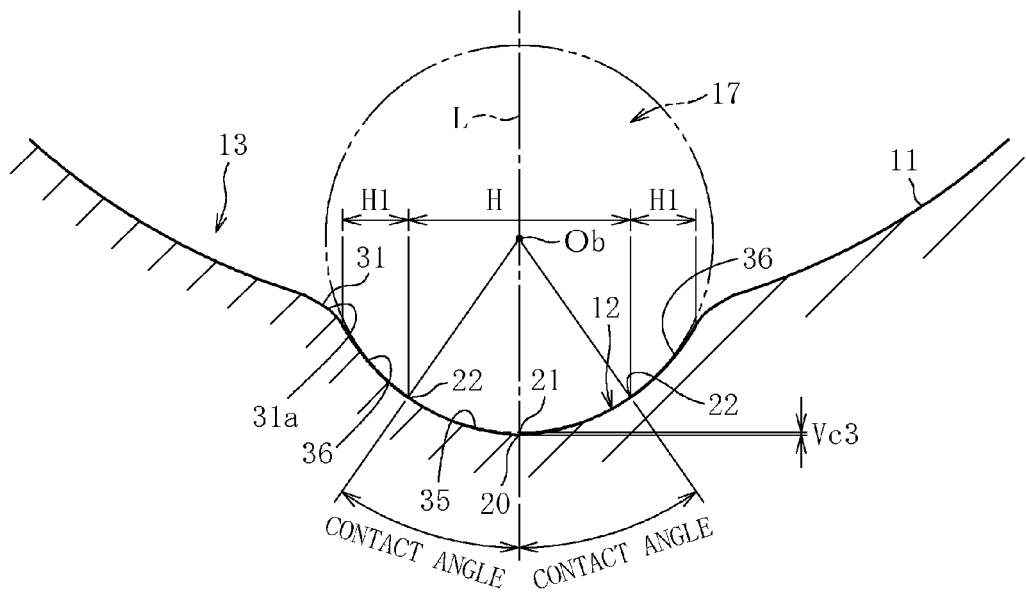
[FIG. 1] A sectional view of a track groove of an outer joint member of a first fixed type constant velocity universal joint according to the present invention.

As illustrated in FIG. 1, a track groove bottom side and track groove opening sides of each of the track grooves 12 of the outer joint member 13 are respectively formed into a Gothic arch shape and an elliptical shape in horizontal cross-section. In other words, the track grooves 12 of the outer joint member 13 each form a simple round track shaped portion 35 on the track groove bottom side and comprises elliptical track shaped portions 36 and 36 respectively on the track groove opening sides. The track chamfers 31 along the boundary portions between the inner surface 11 and the track grooves 12 of the outer joint member 13 are each formed of a round portion 31a as illustrated in FIG. 1.

Figure 2:
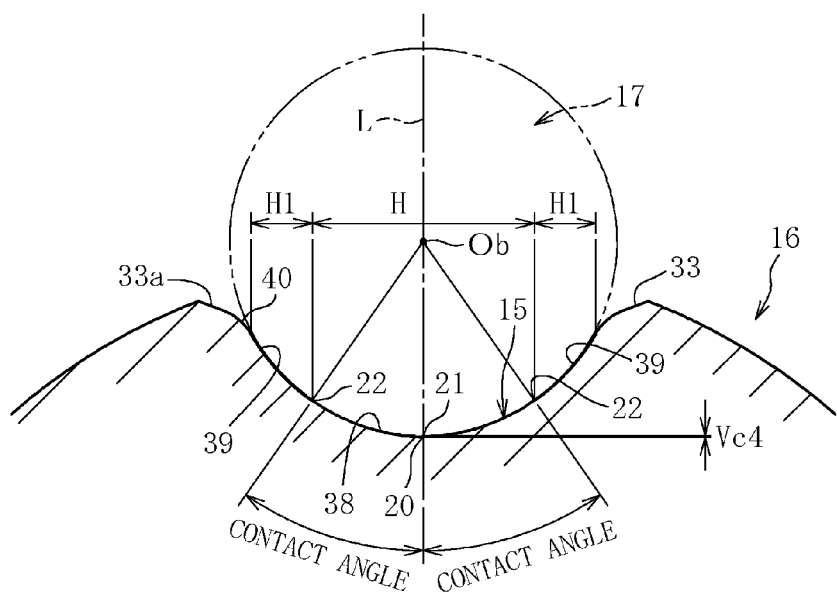
[FIG. 2] A sectional view of a track groove of an inner joint member of the constant velocity universal joint.

As illustrated in FIG. 2, a track groove bottom side and track groove opening sides of each of the track grooves 15 of the inner joint member 16 are respectively formed into a Gothic arch shape and an elliptical shape in horizontal cross-section. In other words, the track grooves 15 of the inner joint member 16 each form a simple round track shaped portion 38 on the track groove bottom side and comprise elliptical track shaped portions 39 and 39 respectively on the track groove opening sides. The track chamfers 33 formed along the boundary portions between the outer surface 14 and the track grooves 15 of the inner joint member 16 are each formed of a tapered surface 33a as illustrated in FIG. 2. Each of the track chamfers 33 and corresponding one of the track grooves 15 are provided continuously with each other through intermediation of a small round portion 40.

Note that, the track chamfers 31 of the outer joint member 13 may be formed into the same shape as that of the track chamfers 33 illustrated in FIG. 2, and the track chamfers 33 of the inner joint member 16 may be formed into the same shape as that of the track chamfers 31 illustrated in FIG. 1.

Figure 3A:
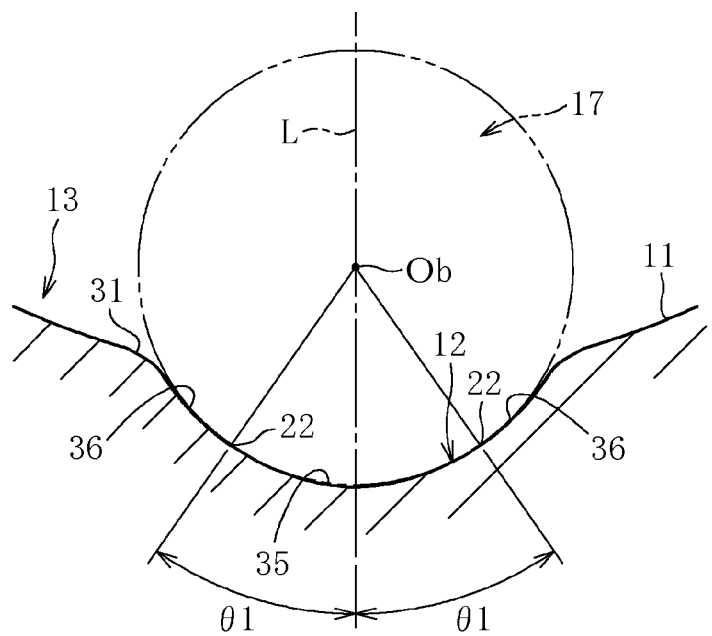
[FIG. 3A] An explanatory view illustrating a shape of the track groove of the constant velocity universal joint, in which angles θ1 each ranges from 30 degrees to 45 degrees.
Figure 3B:
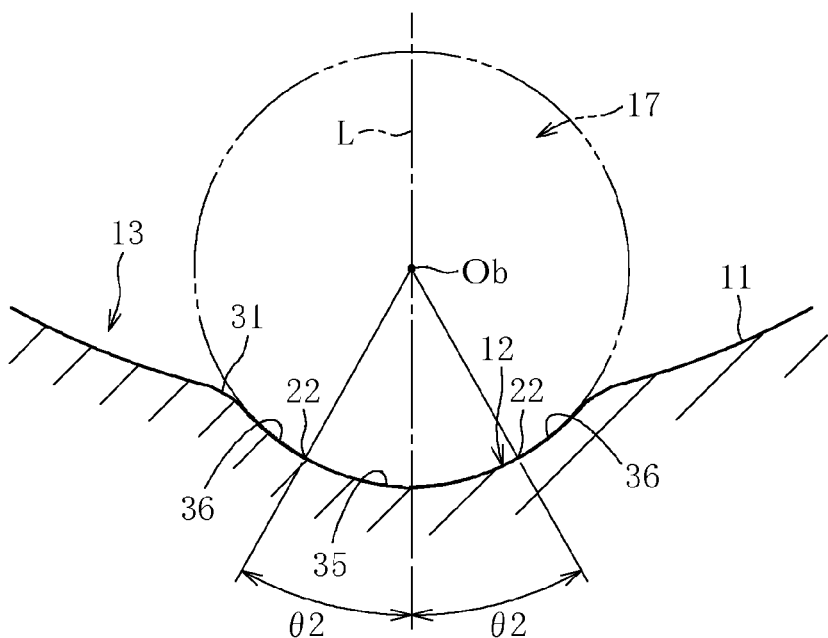
[FIG. 3B] Another explanatory view illustrating the shape of the track groove of the constant velocity universal joint, in which angles θ2 each ranges from 20 degrees to 35 degrees.

As illustrated in FIGS. 3A and 3B, continuous positions 22 of the simple round track shaped portion 35 (38) and the elliptical track shaped portions 36 (39) are located on the groove opening sides within a range of angles θ (θ1 or θ2) with respect to a straight line L connecting a ball center Ob and a track groove bottom center. In other words, as illustrated in FIGS. 1 and 2, the simple round track shaped portion 35 (38) is provided within a range H, and the elliptical track shaped portions 36 (39) are provided within ranges H1, respectively. In FIG. 3A, the angles θ are each indicated by θ1 (30° to 45°), and in FIG. 3B, the angles θ are each indicated by θ2 (20° to 35°).

The track grooves 12, the inlet chamfer (cup-inlet chamfer) 30, the track chamfers 31, the track-inlet chamfers 32, and an opening end surface 13a of the outer joint member 13 are formed by cold-forging finishing. Specifically, the track grooves 12 and the track-inlet chamfers 32 of the outer joint member 13 are formed by simultaneous cold-forging finishing, or the track grooves 12 and the track chamfers 31 of the outer joint member 13 are formed by simultaneous cold-forging finishing.

Forging finishing of the outer joint member 13 can be performed with a conventional manufacturing apparatus (for example, manufacturing apparatus disclosed in Japanese Patent Application Laid-open No. 2009-185933). In this case, it suffices that a track groove forming portion of each of a plurality of split punches is changed in shape so that the simple round track shaped portion 35 and the elliptical track shaped portions 36 and 36 are formed.

Further, the track grooves 15 and the track chamfers 33 of the inner joint member 16 are also formed by simultaneous cold-forging finishing. Forging finishing of the inner joint member 16 can be performed with a conventional manufacturing apparatus (for example, manufacturing apparatus disclosed in Japanese Patent Application Laid-open No. 2007-260698). In this case, it suffices that a track groove forming portion of dies is changed in shape so that the simple round track shaped portion 38 and the elliptical track shaped portions 39 and 39 are formed.

In the fixed type constant velocity universal joint of the present invention, sides near the spherical surface (track groove opening sides) can each be formed into an elliptical shape similar to that of finishing-processed track grooves. In other words, functionally required track ranges are each formed into an elliptical shape, and a track range required for management is formed into a Gothic arch shape. Thus, quality control on a forging die set and products can be facilitated, and a contact state of the balls 17 and the track grooves 12 (15) can be stabilized.

The continuous positions between the Gothic arch shape and the elliptical shapes are located on the groove opening sides within a range of from 20° to 45° with respect to the straight line connecting the ball center Ob and the track groove bottom center. Thus, vertical clearance (VC) amounts for shape management can be sufficiently secured as indicated by VC3 and VC4 respectively in FIGS. 1 and 2. In this way, functionally required track surfaces can be sufficiently secured.

When the inlet chamfer 30 of the outer joint member 13, the track chamfers 31 of the outer joint member 13, the track-inlet chamfers 32 of the outer joint member 13, the track chamfers 33 of the inner joint member 16, and the like are finished by cold forging, a cutting process, a grinding process, and the like, which have been conventionally performed after cold forging, can be omitted. With this, yields can be increased, and manufacturing cost of the fixed type constant velocity universal joint can be reduced.

In particular, when the track grooves 12 and the track-inlet chamfers 32 of the outer joint member 13 are formed by simultaneous cold-forging finishing, or when the track grooves 12 and the track chamfers 31 of the outer joint member 13 and the track grooves 17 and the track chamfers 33 of the inner joint member 16 are formed by simultaneous cold-forging finishing, productivity can be enhanced.

The sufficient number of torque transmitting balls is ten or less, and hence a degree of freedom in design becomes higher. As a result, excellent designability can be achieved.

Figure 6:
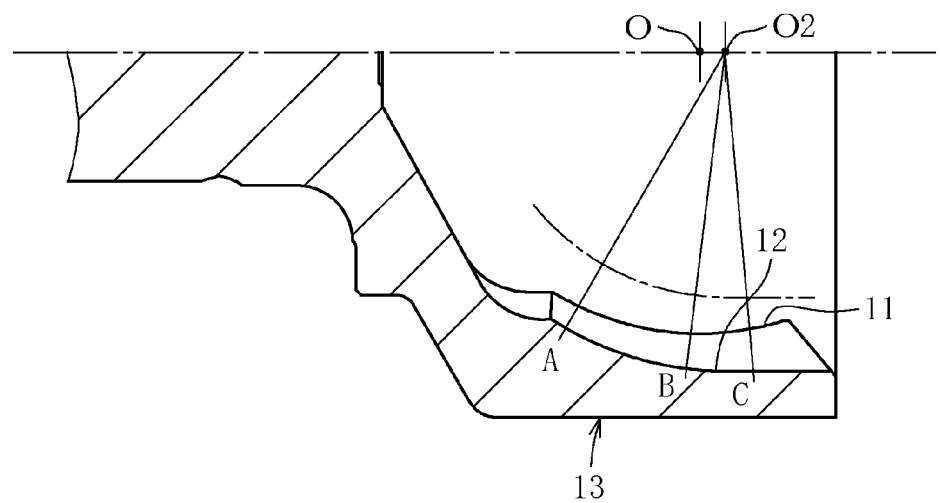
[FIG. 6] A half-cut sectional view of the outer joint member of the constant velocity universal joint.

By the way, in the fixed type constant velocity universal joint of this type, as illustrated in FIG. 6, the track grooves 12 of the outer joint member 13 become gradually shallower from a track open angle side (joint opening side) toward a joint deep side. Thus, when the continuous positions 22 of the simple round track shaped portion 35 (38) and the elliptical track shaped portions 36 (39) are maintained at the same positions over a range of from the open angle side to the joint deep side, a distance from each of the continuous positions 22 to a track edge E (boundary line between the inner surface and the track groove) (refer to FIGS. 7 and 8) becomes smaller toward the joint deep side.

In other words, the angles θ in a cross-section A of FIG. 6 (cross-section taken along a straight line connecting a center O2 of the track grooves 12 and a portion A), the angles θ in a cross-section B of FIG. 6 (cross-section taken along a straight line connecting the center O2 of the track grooves 12 and a portion B), and the angles θ in a cross-section C of FIG. 6 (cross-section taken along a straight line connecting the center O2 of the track grooves 12 and a portion C) in FIGS. 8A, 8B, and 8C are equal to each other.

In this case, a distance from each of the continuous positions 22 to the track edge E in the cross-section A is indicated by La as illustrated in FIG. 8A, a distance from each of the continuous positions 22 to the track edge E in the cross-section B is indicated by Lb as illustrated in FIG. 8B, and a distance from each of the continuous positions 22 to the track edge E in the cross-section C is indicated by Lc as illustrated in FIG. 8C. In this case, a relationship La<Lb<Lc is established. Thus, a contact ellipse protrudes when unexpectedly high torque is born, which causes shortening of a life.

As a countermeasure, in the present invention, as illustrated in FIGS. 7, the continuous angles θ(θa, θb, and θc) between the Gothic arch shape and each of the elliptical shapes are gradually reduced from the open angle side (joint opening side) of the track groove toward the joint deep side. With this setting, there are measured a distance La' from each of the continuous positions 22 to the track edge E in the cross-section A (refer to FIG. 7A), a distance Lb' from each of the continuous positions 22 to the track edge E in the cross-section B (refer to FIG. 7B), and a distance Lc' from each of the continuous positions 22 to the track edge E in the cross-section C (refer to FIG. 7C). In this case, relationships La<La', Lb<Lb', and Lc<Lc' are established.

With this, the contact ellipse is less liable to protrude even at shallow parts of the track grooves on the joint deep side, and hence higher durability can be secured. In this case, contact angles may not be changed over the range of from the joint opening side to the joint deep side, or may be gradually reduced from the joint opening side toward the joint deep side.

Figure 9:
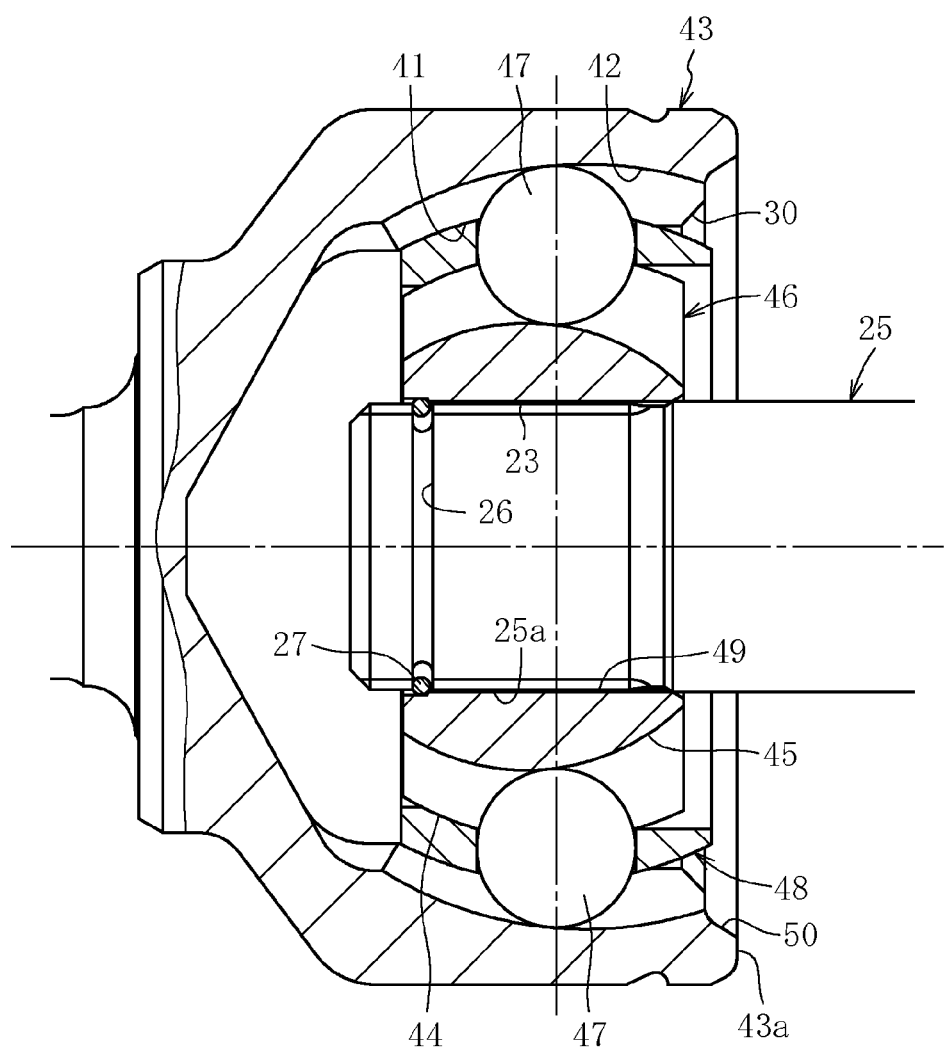
[FIG. 9] A sectional view of a second fixed type constant velocity universal joint according to the present invention.

Next, FIG. 9 illustrates a fixed type constant velocity universal joint of a Birfield type. This fixed type constant velocity universal joint comprises an outer joint member 43 having an inner surface 41 equiangularly provided with a plurality of track grooves 42 formed along the axial direction, an inner joint member 46 having an outer surface 44 equiangularly provided with a plurality of track grooves 45 formed along the axial direction in pairs with the track grooves 42 of the outer joint member 43, torque transmitting balls 47 arranged respectively in ball tracks formed in cooperation between the track grooves 42 of the outer joint member 43 and the track grooves 45 of the inner joint member 46, and a cage 48 interposed between the inner surface 41 of the outer joint member 43 and the outer surface 44 of the inner joint member 46 so as to hold the balls 47.

Also in this case, as illustrated in FIGS. 1 and 2, each one of the track grooves 42 and 45 respectively forms the simple round track shaped portions 35 and 38 on the track groove bottom side and respectively comprises the elliptical track shaped portions 36, 36, 39, and 39 on the track groove opening sides. In addition, the continuous angles between the Gothic arch shape and each of the elliptical shapes are gradually reduced from the open angle side of the track groove toward the joint deep side.

Further, the inlet chamfer (cup-inlet chamfer) 30 is formed along the entire circumference of an opening rim of the outer joint member 43. Track chamfers are formed along boundary portions between the inner surface 41 and the track grooves 42. Track-inlet chamfers are formed along boundary portions between the track grooves 42 and the cup-inlet chamfer 30. Further, track chamfers are formed along boundary portions between the outer surface 44 and the track grooves 45 of the inner joint member 46.

Also in this case, the track grooves 42, the inlet chamfer (cup-inlet chamfer), the track chamfers, the track-inlet chamfers, an opening end surface 43a of the outer joint member 43 are formed by cold-forging finishing. Specifically, the track grooves 42 and the track-inlet chamfers of the outer joint member 43 are formed by simultaneous cold-forging finishing, or the track grooves 42 and the track chamfers of the outer joint member 43 and the track grooves 45 and the track chamfers of the inner joint member 46 are formed by simultaneous cold-forging finishing.

Also in such a fixed type constant velocity universal joint of a Birfield type, the same functions and effects as those of the fixed type constant velocity universal joint of an undercut free type illustrated in FIG. 1 can be obtained.

Figure 10:
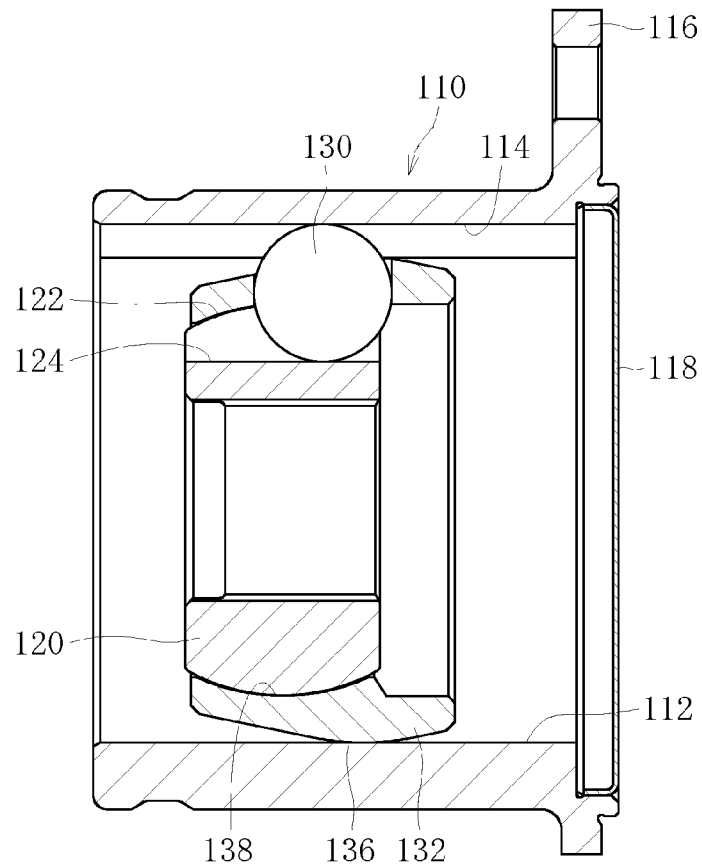
[FIG. 10] A sectional view of a first plunging type constant velocity universal joint according to the present invention.

Next, FIG. 10 illustrates a plunging type constant velocity universal joint of a double offset type. This constant velocity universal joint is a plunging type constant velocity universal joint comprising, as main components, an outer joint member 110, an inner joint member 120, balls 130 as torque transmitting elements, and a cage 132 for holding the balls 130.

The outer joint member 110 has a cylindrical inner peripheral surface (inner surface) 112 provided with equiangular track grooves 114 extending in the axial direction. In this case, the outer joint member 110 is of a flange type, that is, the outer joint member 110 is connected to one of two shafts (drive shaft or driven shaft) to be coupled to each other with the plunging type constant velocity universal joint through intermediation of a flange 116 provided integrally with the outer joint member 110 so that torque can be transmitted. In the following description, the side of the flange 116 of the outer joint member 110 (right side of FIG. 10) is referred to as an outer-joint-member deep side, and the opposite side (left side of FIG. 10) is referred to as an outer-joint-member inlet side. To an opening portion on the outer-joint-member deep side of the outer joint member 110 of a flange type, which is opened at both ends, a cap 118 is mounted because it is necessary to fill an inside of the outer joint member 110 with grease. Note that, there may be employed an outer joint member of a type in which a stem section provided with a serrated shaft is provided.

The inner joint member 120 has a spherical outer peripheral surface (outer surface) 122 provided with equiangular track grooves 124 extending in the axial direction. The inner joint member 120 is connected to the other of the two shafts (driven shaft or drive shaft) to be coupled to each other with the plunging type constant velocity universal joint through intermediation of a serrated hole 126 formed at an axial part thereof so that torque can be transmitted.

The track grooves 114 of the outer joint member 110 and the track grooves 124 of the inner joint member 120 are provided in pairs with each other, and the balls 130 are each incorporated between a corresponding pair of the track grooves 114 and 124. The number of the balls is arbitrarily set. Generally, six or eight balls 130 are used, and all the balls 130 are held by the cage 132 within the same plane.

Figure 11:
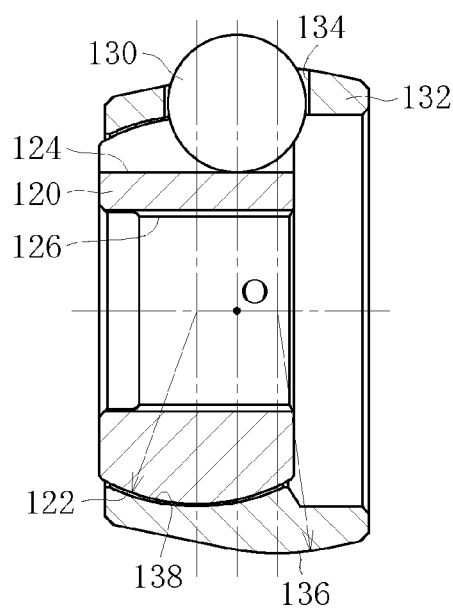
[FIG. 11] A sectional view of interior components of the plunging type constant velocity universal joint illustrated in FIG. 10.

The cage 132 is provided with pockets 134 for accommodating the balls 130 at predetermined intervals in the circumferential direction. An outer peripheral surface 136 of the cage 132 is provided with a convex spherical surface part in contact with the inner peripheral surface (inner surface) 112 of the outer joint member 110, and an inner peripheral surface 138 of the cage 132 is provided with a concave spherical surface part in contact with the outer peripheral surface 122 of the inner joint member 120. As illustrated in FIG. 11, a spherical surface center of the convex spherical surface part of the outer peripheral surface 136 and a spherical surface center of the concave spherical surface part of the inner peripheral surface 138 are offset on both axial sides by equal distances with respect to the joint center O. In each of the pockets 134, a position of a ball center in the axial direction is set to be arranged at a bisecting position of a distance from the spherical surface center of the convex spherical surface part of the outer peripheral surface 136 to the spherical surface center of the concave spherical surface part of the inner peripheral surface 138 of the cage 132.

Also in this case, as illustrated in FIGS. 1 and 2, each one of the track grooves 114 and 124 respectively forms the simple round track shaped portions 35 and 38 on the track groove bottom side and respectively comprises the elliptical track shaped portions 36, 36, 39, and 39 on the track groove opening sides.

Further, the inlet chamfer (cup-inlet chamfer) 30 is formed along the entire circumference of an opening rim of the outer joint member 110. Track chamfers are formed along boundary portions between the inner surface (inner peripheral surface) 112 and the track grooves 114. Track-inlet chamfers are formed along boundary portions between the track grooves 114 and the cup-inlet chamfer 30. Further, track chamfers are formed along boundary portions between the outer surface 122 and the track grooves 124 of the inner joint member 120.

Figure 12:
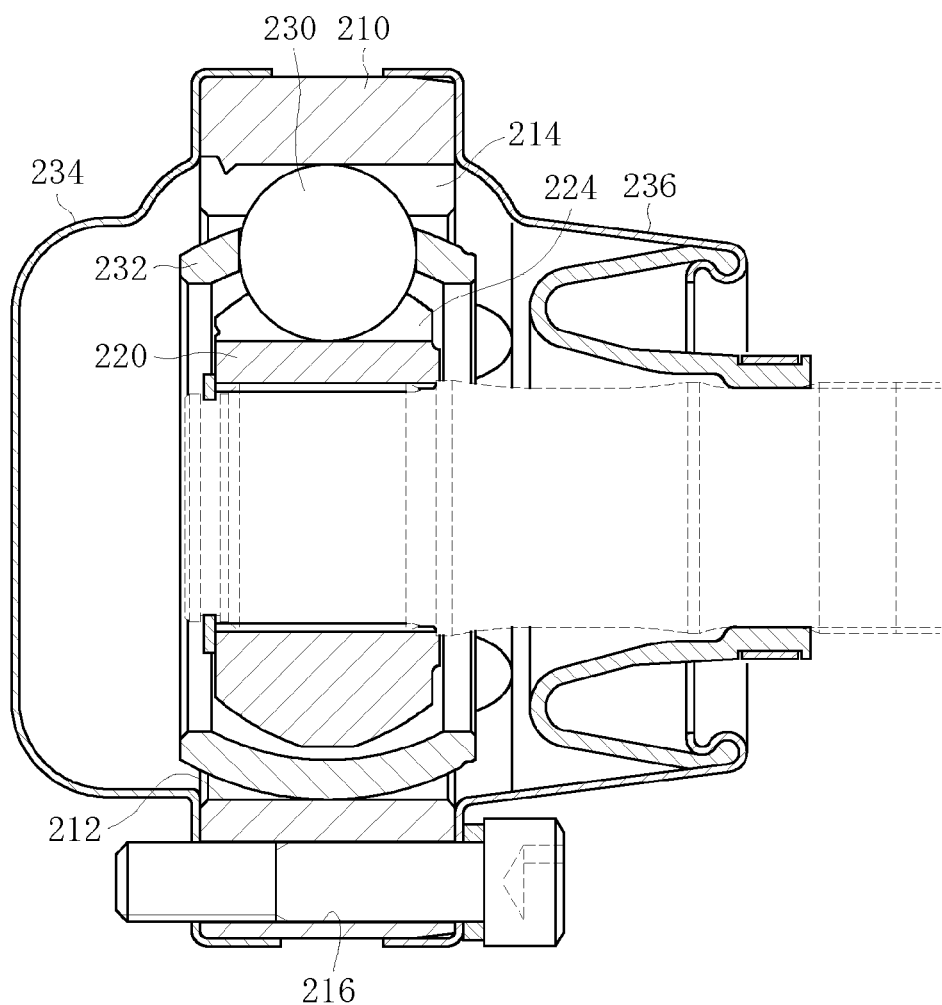
[FIG. 12] A sectional view of a second plunging type constant velocity universal joint according to the present invention.
Figure 13:
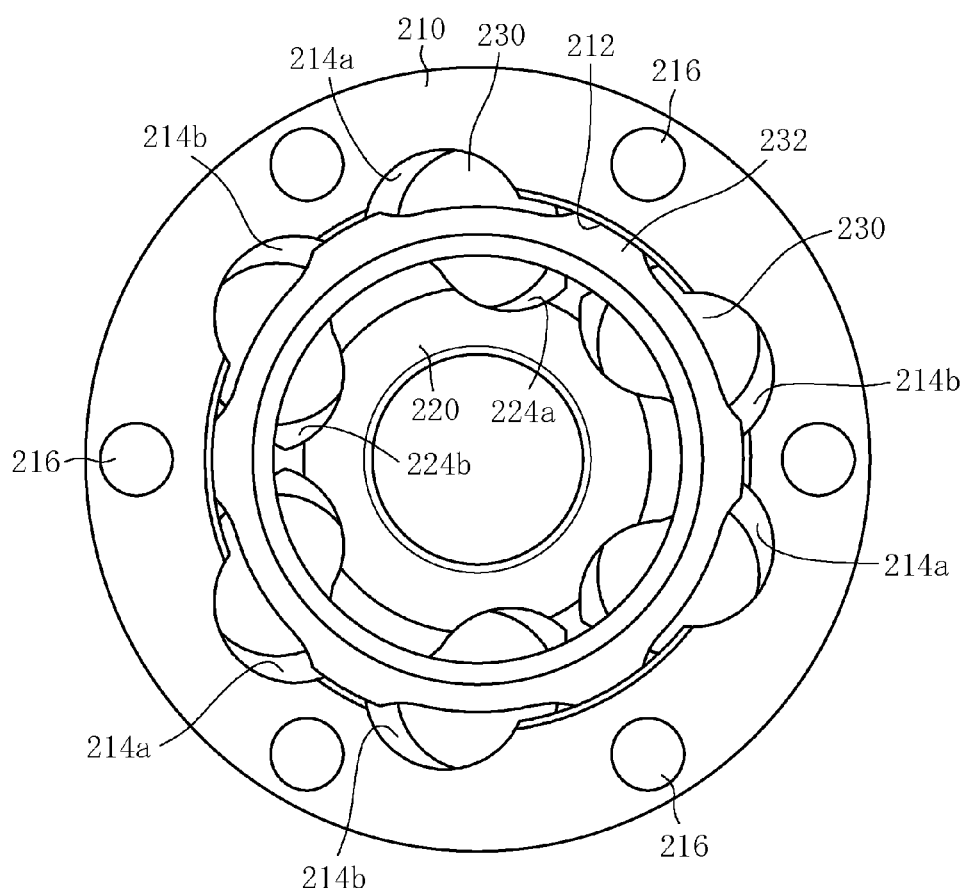
[FIG. 13] A front view of the plunging type constant velocity universal joint.
Figure 14:
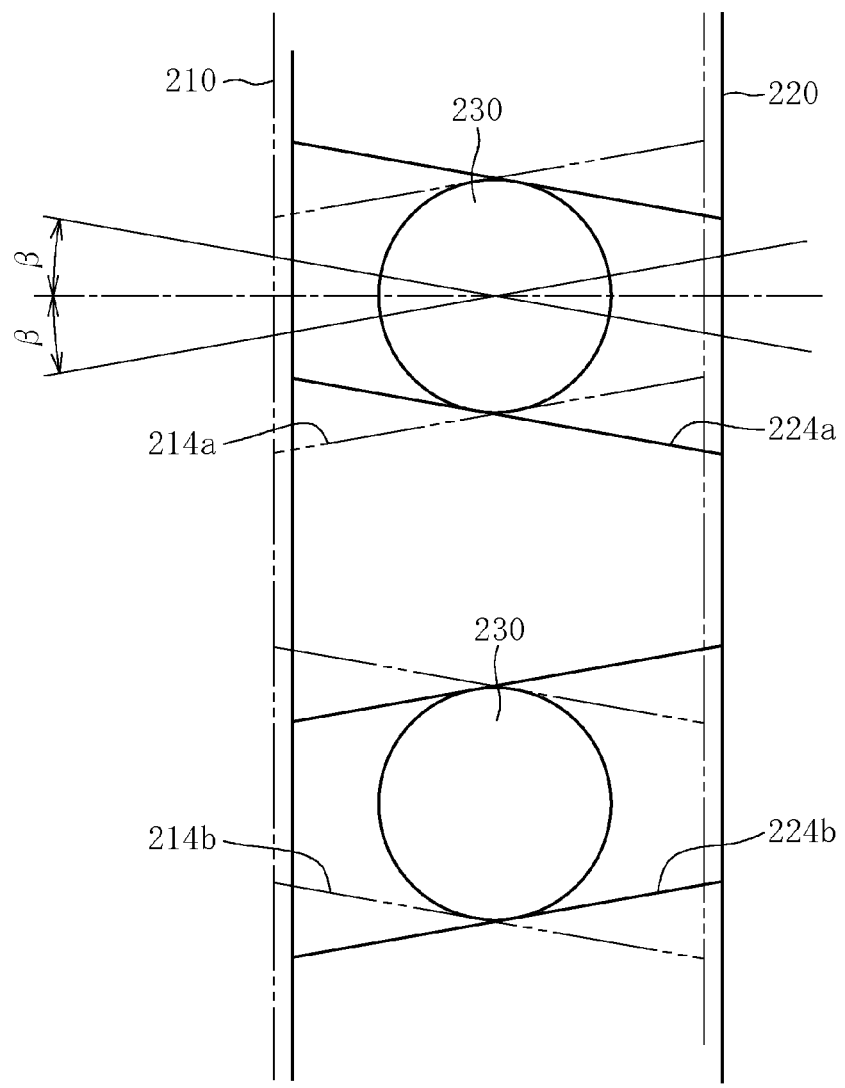
[FIG. 14] A developed view of track grooves of the plunging type constant velocity universal joint.
Figure 15:
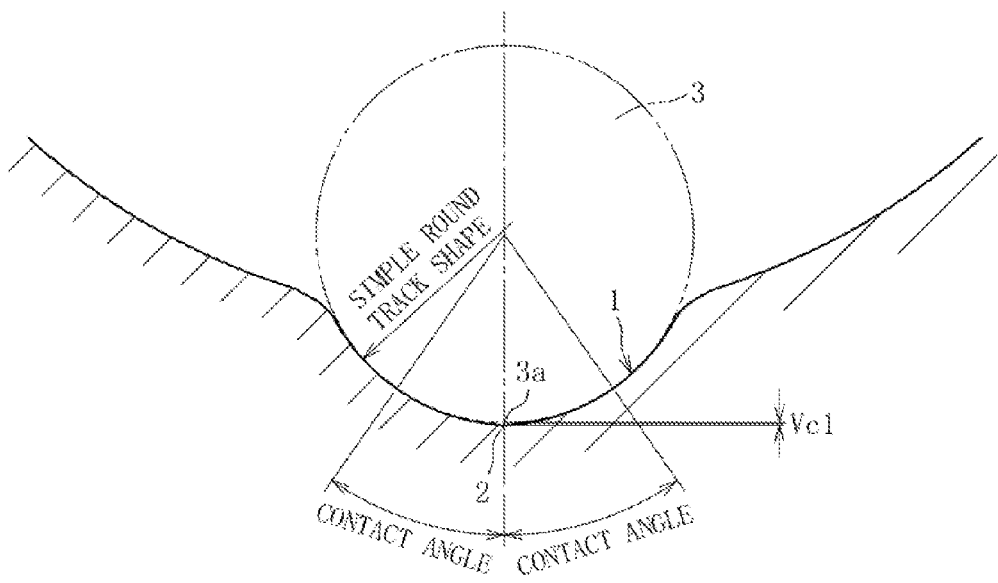
[FIG. 15] A sectional view illustrating a sectional shape of a forging-molded track groove.
Figure 16:
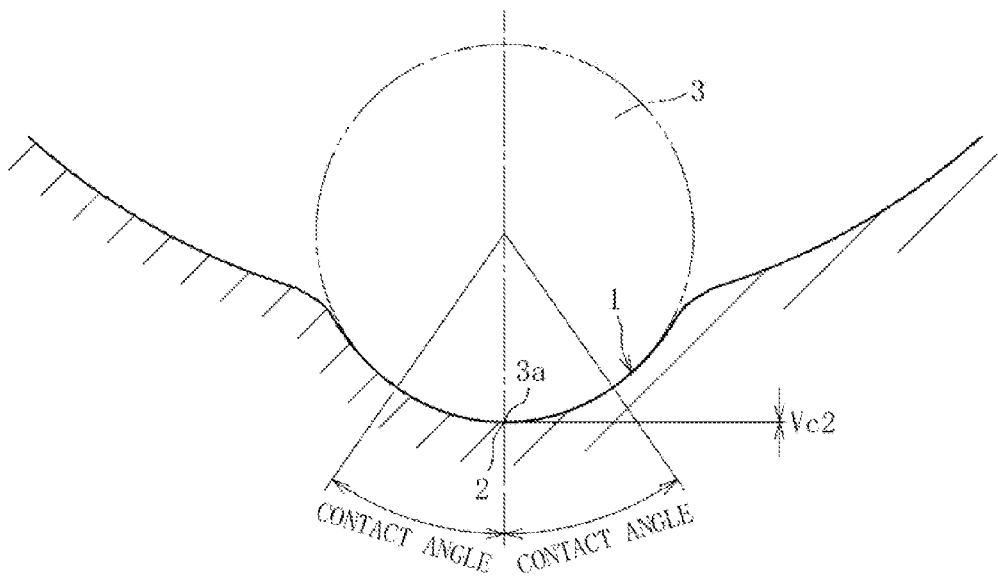
[FIG. 16] A sectional view illustrating a sectional shape of a finishing-processed track groove.

Next, an example of a cross groove type constant velocity universal joint is illustrated in FIGS. 12 to 14. This cross groove type constant velocity universal joint comprises, as main components, an outer joint member 210, an inner joint member 220, balls 230 as torque transmitting elements, and a cage 232 for holding the balls 230.

The outer joint member 210 herein is of a disk type, and has a cylindrical inner peripheral surface (inner surface) 212 provided with track grooves 214a and 214b. Bolt holes 216 are equiangularly arranged to be located between respective pairs of the track grooves 214a and 214b of the outer joint member 210. Further, an end cap 234 is fixed to one end portion of the outer joint member 210, and a boot adapter 236 is fixed to another end portion thereof. Note that, other than the outer joint member of the disk type illustrated as an example herein, there may be employed an outer joint member of a flange type or a bell-shaped type.

The inner joint member 220 has a substantially spherical outer peripheral surface 222 provided with track grooves 224a and 224b. The inner joint member 220 has a spline hole, and, as illustrated by broken lines, is fitted to a spline shaft of a shaft so that torque can be transmitted.

The track grooves 214a inclined with respect to an axial line of the outer joint member 210 and the track grooves 214b inclined with respect to the axial line of the outer joint member 210 into a direction opposite to that of the track grooves 214a are alternately arranged in the circumferential direction. Similarly, the track grooves 224a inclined with respect to an axial line of the inner joint member 220 and the track grooves 224b inclined with respect to the axial line into a direction opposite to that of the track grooves 224a are alternately arranged in the circumferential direction.

With reference to FIG. 14, intersection angles of the track grooves 214a, 214b, 224a, and 224b with respect to the axial line are each denoted by reference symbol β. The track grooves 214a of the outer joint member 210 and the track grooves 224a of the inner joint member 220, which are inclined in the directions opposite to each other, are formed in pairs, and an angle formed between each of the pairs is denoted by reference symbol 213. Similarly, the track grooves 214b of the outer joint member 210 and the track grooves 224b of the inner joint member 220, which are inclined in the directions opposite to each other, are formed in pairs, and an angle formed between each of the pairs is denoted by reference symbol 2β.

The balls 230 are each incorporated between an intersecting portion of each of the pair of the track grooves 214a of the outer joint member 210 and the track grooves 224a of the inner joint member 220 and corresponding one of intersecting portions of the track grooves 214b of the outer joint member 210 and the track grooves 224b of the inner joint member 220. FIG. 10 illustrates a case where the number of the balls 230 is six.

Also in this case, as illustrated in FIGS. 1 and 2, each one of the track grooves 214 and 224 respectively forms the simple round track shaped portions 35 and 38 on the track groove bottom side and respectively comprises the elliptical track shaped portions 36, 36, 39, and 39 on the track groove opening sides.

Further, the inlet chamfer (cup-inlet chamfer) 30 is formed along the entire circumference of an opening rim of the outer joint member 210. Track chamfers are formed along boundary portions between the inner surface (inner peripheral surface) 212 and the track grooves 214. Track-inlet chamfers are formed along boundary portions between the track grooves 212 and the cup-inlet chamfer 30. Further, track chamfers are formed along boundary portions between the outer surface 222 and the track grooves 224 of the inner joint member 220.

Note that, also in each of the constant velocity universal joints illustrated in FIGS. 10 to 14, it is preferred that the track grooves, the inlet chamfer (cup-inlet chamfer), the track chamfers, the track-inlet chamfers, the opening end surface of the outer joint member be formed by cold-forging finishing.

As described above, whether in the plunging type constant velocity universal joint of a double offset type or in the plunging type constant velocity universal joint of a cross groove type, the same functions and effects as those of the fixed type constant velocity universal joint of an undercut free type illustrated in FIG. 1 can be obtained. As described hereinabove, the present invention is applicable to constant velocity universal joints of various types. Specifically, the constant velocity universal joint of the present invention can be used as a fixed type constant velocity universal joint for a drive shaft of an automobile, a plunging type constant velocity universal joint for a drive shaft of an automobile, and the like. Alternatively, the constant velocity universal joint of the present invention can be used as a fixed type constant velocity universal joint for a propeller shaft of an automobile, a plunging type constant velocity universal joint for a propeller shaft of an automobile, and the like.

With regard to description hereinabove of the embodiments of the present invention, the present invention is not limited to those embodiments, and various modifications may be made thereto. For example, with regard to the track grooves of each of the outer joint member and the inner joint member, which are formed by cold-forging finishing in the above-mentioned embodiments, only the track grooves of any one of the outer joint member and the inner joint member may be formed by cold-forging finishing. A curvature radius of the round portion of each of the chamfers can be variously changed as long as the track grooves and the inner surface (or outer surface) are smoothly continuous with each other. Further, displacement amounts of the continuous angles θa, θb, and θc in FIGS. 7 and the like can be variously changed as long as the contact ellipse is less liable to protrude even at shallow parts of the track grooves on the joint deep side.

Industrial Applicability

The present invention is applicable to the fixed type constant velocity universal joints of a Rzeppa type and an undercut free type, and the plunging type constant velocity universal joints of a double offset type and a cross groove type. Thus, the constant velocity universal joint of the present invention can be used as a fixed type constant velocity universal joint for a drive shaft of an automobile, a plunging type constant velocity universal joint for a drive shaft of an automobile, and the like. Alternatively, the constant velocity universal joint of the present invention can be used as a fixed type constant velocity universal joint for a propeller shaft of an automobile, a plunging type constant velocity universal joint for a propeller shaft of an automobile, and the like.

Reference Signs List
- 11 inner surface
- 12 track groove
- 13 outer joint member
- 14 outer surface
- 15 track groove
- 16 inner joint member
- 17 torque transmitting ball
- 18 cage
- 30 cup-inlet chamfer
- 31 track chamfer
- 32 track-inlet chamfer
- 33 track chamfer
- 41 inner spherical surface (inner surface)
- 42, 45 track groove
- 43 outer joint member
- 44 outer spherical surface
- 46 inner joint member
- 47 ball
- 48 cage
- 110 outer joint member
- 112 inner surface (inner peripheral surface)
- 114, 124 track groove
- 120 inner joint member
- 122 outer surface (outer peripheral surface)
- 132 cage
- 134 pocket
- 136 outer peripheral surface
- 138 inner peripheral surface
- 210 outer joint member
- 212 track groove
- 212 inner peripheral surface
- 214, 214a, 214b track groove
- 220 inner joint member
- 222 outer surface (outer peripheral surface)
- 224, 224a, 224b track groove
- 230 ball
- 232 cage

The invention claimed is:

1. A constant velocity universal joint comprising:
   an outer joint member having an inner surface provided with track grooves;
   an inner joint member having an outer surface provided with track grooves;
   a plurality of torque transmitting balls arranged in torque transmitting ball tracks formed by cooperation between the track grooves of the outer joint member and the track grooves of the inner joint member, the track grooves of the inner joint member corresponding to the track grooves of the outer joint member; and
   a cage for holding the torque transmitting balls,
   wherein at least one of each of the track grooves of the outer joint member and each of the track grooves of the inner joint member is formed by cold-forging finishing,
   wherein a track groove bottom side of the at least one of each of the track grooves of the outer joint member and each of the track grooves of the inner joint member is formed into a Gothic arch shape in horizontal cross-section,
   wherein track groove opening sides of the at least one of each of the track grooves of the outer joint member and each of the track grooves of the inner joint member are each formed into an elliptical shape in horizontal cross-section, and
   wherein a continuous position of the Gothic arch shape and the elliptical shape is located on a groove opening side within a range of from 30 degrees to 45 degrees with respect to a straight line connecting a ball center and a track groove bottom center.

2. A constant velocity universal joint according to claim 1, further comprising:
   a plurality of track chamfers formed respectively along a boundary portion between the inner surface and each of the track grooves of the outer joint member and a boundary portion between the outer surface and each of the track grooves of the inner joint member; and
   a round portion coupled to a corresponding one of the track grooves of the outer joint member and a round portion coupled to a corresponding one of the track grooves of the inner joint member, which are respectively formed on a track groove side of the track chamfer of the outer joint member and a track groove side of the track chamfer of the inner joint member.

3. A constant velocity universal joint according to claim 1, further comprising a plurality of track chamfers formed respectively along a boundary portion between the inner surface and each of the track grooves of the outer joint member and a boundary portion between the outer surface and each of the track grooves of the inner joint member, wherein the track chamfers each have a round shape.

4. A constant velocity universal joint according to claim 1, further comprising an inlet chamfer formed along an entire circumference of an opening rim of the outer joint member, a track chamfer formed along a boundary portion between the inner surface and each of the track grooves of the outer joint member, and a track-inlet chamfer formed along a boundary portion between the inlet chamfer and each of the track grooves of the outer joint member are formed by cold-forging finishing.

5. A constant velocity universal joint according to claim 1, wherein an opening end surface of the outer joint member has an inlet chamfer formed there-along or an entire circumference of an opening rim of the outer joint member is formed by cold-forging finishing.

6. A constant velocity universal joint according to claim 1, further comprising an inlet chamfer formed along an entire circumference of an opening rim of the outer joint member, and a track-inlet chamfer formed along a boundary portion between the inlet chamfer and each of the track grooves of the outer joint member, wherein the track grooves of the outer joint member and the track-inlet chamfers of the outer joint member are formed by cold-forging finishing.

7. A constant velocity universal joint according to claim 1, further comprising:
  a plurality of track chamfers formed respectively along a boundary portion between the inner surface and each of the track grooves of the outer joint member and a boundary portion between the outer surface and each of the track grooves of the inner joint member,
  wherein the track grooves of the outer joint member, the track grooves of the inner joint member, and the track chamfers of the inner joint member are formed by simultaneous cold-forging finishing.

8. A constant velocity universal joint according to claim 1, wherein a track groove bottom of each of the track grooves of the outer joint member and a track groove bottom of each of the track grooves of the inner joint member are each formed of a circular-arc portion and a linear portion.

9. An automobile comprising:
  a drive shaft; and
  a constant velocity universal joint according to claim 1.

10. An automobile comprising:
  a propeller shaft; and
  a constant velocity universal joint according to claim 1.

11. A constant velocity universal joint according to claim 1, wherein a number of the torque transmitting balls is ten or less.

12. A constant velocity universal joint comprising:
  an outer joint member having an inner surface provided with track grooves;
  an inner joint member having an outer surface provided with track grooves;
  a plurality of torque transmitting balls arranged in torque transmitting ball tracks formed by cooperation between the track grooves of the outer joint member and the track grooves of the inner joint member, the track grooves of the inner joint member corresponding to the track grooves of the outer joint member; and
  a cage for holding the torque transmitting balls,
  wherein at least one of each of the track grooves of the outer joint member and each of the track grooves of the inner joint member is formed by cold-forging finishing,
  wherein a track groove bottom side of the at least one of each of the track grooves of the outer joint member and each of the track grooves of the inner joint member is formed into a Gothic arch shape in horizontal cross-section,
  wherein track groove opening sides of the at least one of each of the track grooves of the outer joint member and each of the track grooves of the inner joint member are each formed into an elliptical shape in horizontal cross-section, and
  wherein, for each respective track groove of the at least one of each of the track grooves of the outer joint member and each of the track grooves of the inner joint member, a continuous angle formed by a line bisecting a track cross-section connecting a ball center and a track groove bottom center of the respective track groove and a line connecting the ball center and a continuous position of the Gothic arch shape and the elliptical shape is gradually reduced in size from an opening angle side of the respective track groove toward a joint deep side.

13. A constant velocity universal joint according to claim 12, wherein the continuous position of the Gothic arch shape and the elliptical shape is located on a groove opening side within a range of from 30 degrees to 45 degrees with respect to a straight line connecting the ball center and the track groove bottom center.

14. A constant velocity universal joint according to claim 12, wherein the continuous position of the Gothic arch shape and the elliptical shape is located on a groove opening side within a range of from 20 degrees to 45 degrees with respect to a straight line connecting the ball center and the track groove bottom center.

15. A constant velocity universal joint according to claim 12, further comprising:
  a plurality of track chamfers formed respectively along a boundary portion between the inner surface and each of the track grooves of the outer joint member and a boundary portion between the outer surface and each of the track grooves of the inner joint member; and
  a round portion coupled to a corresponding one of the track grooves of the outer joint member and a round portion coupled to a corresponding one of the track grooves of the inner joint member, which are respectively formed on a track groove side of the track chamfer of the outer joint member and a track groove side of the track chamfer of the inner joint member.

16. A constant velocity universal joint according to claim 12, further comprising a plurality of track chamfers formed respectively along a boundary portion between the inner surface and each of the track grooves of the outer joint member and a boundary portion between the outer surface and each of the track grooves of the inner joint member, wherein the track chamfers each have a round shape.

17. A constant velocity universal joint according to claim 12, further comprising an inlet chamfer formed along an entire circumference of an opening rim of the outer joint member, a track chamfer formed along a boundary portion between the inner surface and each of the track grooves of the outer joint member, and a track-inlet chamfer formed along a boundary portion between the inlet chamfer and each of the track grooves of the outer joint member are formed by cold-forging finishing.

18. A constant velocity universal joint according to claim 12, wherein an opening end surface of the outer joint member has an inlet chamfer formed there-along or an entire circumference of an opening rim of the outer joint member is formed by cold-forging finishing.

19. A constant velocity universal joint according to claim 12, further comprising an inlet chamfer formed along an entire circumference of an opening rim of the outer joint member, and a track-inlet chamfer formed along a boundary portion between the inlet chamfer and each of the track grooves of the outer joint member, wherein the track grooves of the outer joint member and the track-inlet chamfers of the outer joint member are formed by cold-forging finishing.

20. A constant velocity universal joint according to claim 12, further comprising:
a plurality of track chamfers formed respectively along a boundary portion between the inner surface and each of the track grooves of the outer joint member and a boundary portion between the outer surface and each of the track grooves of the inner joint member,
wherein the track grooves of the outer joint member, the track grooves of the inner joint member, and the track chamfers of the inner joint member are formed by simultaneous cold-forging finishing.

21. A constant velocity universal joint according to claim 12, wherein a track groove bottom of each of the track grooves of the outer joint member and a track groove bottom of each of the track grooves of the inner joint member are each formed of a circular-arc portion and a linear portion.

22. An automobile comprising:
a drive shaft; and
a constant velocity universal joint according to claim 12.

23. An automobile comprising:
a propeller shaft; and
a constant velocity universal joint according to claim 12.

24. A constant velocity universal joint according to claim 12, wherein a number of the torque transmitting balls is ten or less.

25. A constant velocity universal joint comprising:
an outer joint member having an inner surface provided with track grooves;
an inner joint member having an outer surface provided with track grooves;
a plurality of torque transmitting balls arranged in torque transmitting ball tracks formed by cooperation between the track grooves of the outer joint member and the track grooves of the inner joint member, the track grooves of the inner joint member corresponding to the track grooves of the outer joint member; and
a cage for holding the torque transmitting balls,
wherein at least one of each of the track grooves of the outer joint member and each of the track grooves of the inner joint member is formed by cold-forging finishing,
wherein a track groove bottom side of the at least one of each of the track grooves of the outer joint member and each of the track grooves of the inner joint member is formed into a Gothic arch shape in horizontal cross-section,
wherein track groove opening sides of the at least one of each of the track grooves of the outer joint member and each of the track grooves of the inner joint member are each formed into an elliptical shape in horizontal cross-section, and
wherein a continuous position of the Gothic arch shape and the elliptical shape is located on a groove opening side within a range of from 20 degrees to 45 degrees with respect to a straight line connecting a ball center and a track groove bottom center.

26. A constant velocity universal joint according to claim 25, further comprising:
a plurality of track chamfers formed respectively along a boundary portion between the inner surface and each of the track grooves of the outer joint member and a boundary portion between the outer surface and each of the track grooves of the inner joint member; and
a round portion coupled to a corresponding one of the track grooves of the outer joint member and a round portion coupled to a corresponding one of the track grooves of the inner joint member, which are respectively formed on a track groove side of the track chamfer of the outer joint member and a track groove side of the track chamfer of the inner joint member.

27. A constant velocity universal joint according to claim 25, further comprising a plurality of track chamfers formed respectively along a boundary portion between the inner surface and each of the track grooves of the outer joint member and a boundary portion between the outer surface and each of the track grooves of the inner joint member, wherein the track chamfers each have a round shape.

28. A constant velocity universal joint according to claim 25, further comprising an inlet chamfer formed along an entire circumference of an opening rim of the outer joint member, a track chamfer formed along a boundary portion between the inner surface and each of the track grooves of the outer joint member, and a track-inlet chamfer formed along a boundary portion between the inlet chamfer and each of the track grooves of the outer joint member are formed by cold-forging finishing.

29. A constant velocity universal joint according to claim 25, wherein an opening end surface of the outer joint member has an inlet chamfer formed there-along or an entire circumference of an opening rim of the outer joint member is formed by cold-forging finishing.

30. A constant velocity universal joint according to claim 25, further comprising an inlet chamfer formed along an entire circumference of an opening rim of the outer joint member, and a track-inlet chamfer formed along a boundary portion between the inlet chamfer and each of the track grooves of the outer joint member, wherein the track grooves of the outer joint member and the track-inlet chamfers of the outer joint member are formed by cold-forging finishing.

31. A constant velocity universal joint according to claim 25, further comprising:
a plurality of track chamfers formed respectively along a boundary portion between the inner surface and each of the track grooves of the outer joint member and a boundary portion between the outer surface and each of the track grooves of the inner joint member,
wherein the track grooves of the outer joint member, the track grooves of the inner joint member, and the track chamfers of the inner joint member are formed by simultaneous cold-forging finishing.

32. A constant velocity universal joint according to claim 25, wherein a track groove bottom of each of the track grooves of the outer joint member and a track groove bottom of each of the track grooves of the inner joint member are each formed of a circular-arc portion and a linear portion.

33. An automobile comprising:
a drive shaft; and
a constant velocity universal joint according to claim 25.

34. An automobile comprising:
a propeller shaft; and
a constant velocity universal joint according to claim 25.

35. A constant velocity universal joint according to claim 25, wherein a number of the torque transmitting balls is ten or less.

* * * * *